US011578189B2

(12) United States Patent
Seo et al.

(10) Patent No.: US 11,578,189 B2
(45) Date of Patent: *Feb. 14, 2023

(54) OPTICAL FILM AND IMAGE DISPLAY DEVICE INCLUDING SAME

(71) Applicant: LG CHEM, LTD., Seoul (KR)

(72) Inventors: Jung Hyun Seo, Daejeon (KR); Yeong Rae Chang, Daejeon (KR); Jin Young Park, Daejeon (KR); Han Na Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 898 days.

This patent is subject to a terminal disclaimer.

(21) Appl. No.: 16/339,987

(22) PCT Filed: Dec. 12, 2017

(86) PCT No.: PCT/KR2017/014572
§ 371 (c)(1),
(2) Date: Apr. 5, 2019

(87) PCT Pub. No.: WO2018/110949
PCT Pub. Date: Jun. 21, 2018

(65) Prior Publication Data
US 2020/0041696 A1 Feb. 6, 2020

(30) Foreign Application Priority Data

Dec. 12, 2016 (KR) .................... 10-2016-0168857
Dec. 11, 2017 (KR) .................... 10-2017-0169718

(51) Int. Cl.
| | | |
|---|---|---|
| *C08K 7/26* | (2006.01) |
| *C09D 7/65* | (2018.01) |
| *C09D 7/61* | (2018.01) |
| *C08J 7/04* | (2020.01) |
| *C09D 5/00* | (2006.01) |
| *C09D 135/02* | (2006.01) |
| *G02B 1/111* | (2015.01) |
| *G02B 5/02* | (2006.01) |

(52) U.S. Cl.
CPC .............. *C08K 7/26* (2013.01); *C08J 7/042* (2013.01); *C09D 5/006* (2013.01); *C09D 7/61* (2018.01); *C09D 7/65* (2018.01); *C09D 135/02* (2013.01); *G02B 1/111* (2013.01); *G02B 5/0284* (2013.01); *C08J 2367/02* (2013.01); *C08J 2435/02* (2013.01); *C08K 2201/005* (2013.01)

(58) Field of Classification Search
CPC ...... C08K 7/26; C08K 2201/005; C08J 7/042; C08J 2367/02; C08J 2435/02; C09D 5/006; C09D 7/61; G02B 1/111
See application file for complete search history.

(56) References Cited

U.S. PATENT DOCUMENTS

| | | | |
|---|---|---|---|
| 2006/0092495 A1* | 5/2006 | Muramatsu | G02B 5/3025 359/275 |
| 2008/0218865 A1 | 9/2008 | Iwata et al. | |
| 2008/0260997 A1 | 10/2008 | Iwata et al. | |
| 2009/0002831 A1 | 1/2009 | Mikami et al. | |
| 2009/0021834 A1 | 1/2009 | Iwata et al. | |
| 2009/0268299 A1 | 10/2009 | Furui et al. | |
| 2010/0283944 A1 | 11/2010 | Kodama et al. | |
| 2010/0283945 A1 | 11/2010 | Kodama et al. | |
| 2010/0284071 A1 | 11/2010 | Kodama et al. | |
| 2011/0194055 A1 | 8/2011 | Kodama et al. | |
| 2012/0321874 A1 | 12/2012 | Shim et al. | |
| 2013/0100367 A1 | 4/2013 | Takahashi et al. | |
| 2013/0216819 A1 | 8/2013 | Kim et al. | |
| 2014/0071528 A1* | 3/2014 | Horio | G02B 5/3025 359/488.01 |
| 2014/0127465 A1 | 5/2014 | Shim et al. | |
| 2014/0211316 A1 | 7/2014 | Furui et al. | |
| 2014/0254021 A1* | 9/2014 | Furui | G02F 1/133504 427/161 |
| 2014/0340755 A1 | 11/2014 | Eguchi et al. | |

FOREIGN PATENT DOCUMENTS

| | | |
|---|---|---|
| CN | 101910878 A | 12/2010 |
| CN | 102209916 A | 10/2011 |
| CN | 103930803 A | 7/2014 |
| CN | 105974500 A | 9/2016 |
| JP | 2014-059334 A | 4/2014 |
| JP | 2015-210273 A | 11/2015 |

(Continued)

OTHER PUBLICATIONS

Translation of WO 2016076302, Akada et al., May 19, 2016. (Year: 2016).*
International Search Report & Written Opinion issued for International Application No. PCT/KR2017/014572 dated Mar. 30, 2018, 11 pages.
Extended European Search Report issued for European Patent Application No. 17880995.0 dated Jul. 25, 2019, 7 pages.

*Primary Examiner* — Hai Vo
(74) *Attorney, Agent, or Firm* — Rothwell, Figg, Ernst & Manbeck, P.C.

(57) ABSTRACT

The present invention relates to an optical film exhibiting excellent optical properties such as low gloss value and reflectance, and an appropriate level of haze properties, and to an image display device including the same. The optical film comprises: a light-transmitting substrate film; an antiglare layer including a binder containing a (meth)acrylate-based crosslinked polymer, and organic fine particles of a micron (µm) scale dispersed on the binder and inorganic fine particles of a nanometer (nm) scale dispersed on the binder; and a low refractive index layer which is formed on the antiglare layer and includes a binder resin containing a (co)polymer of a photopolymerizable compound, and hollow silica particles dispersed in the binder resin, wherein the organic and inorganic fine particles exhibit a predetermined particle size distribution, refractive index difference, and content range.

13 Claims, No Drawings

(56) References Cited

FOREIGN PATENT DOCUMENTS

| | | |
|---|---|---|
| KR | 10-2011-0095820 A | 8/2011 |
| KR | 10-1189196 B1 | 10/2012 |
| KR | 10-1202050 B1 | 11/2012 |
| KR | 10-1205252 B1 | 11/2012 |
| KR | 10-2013-0010445 A | 1/2013 |
| KR | 10-1296825 B1 | 8/2013 |
| KR | 10-1392301 B1 | 5/2014 |
| KR | 10-2014-0072859 A | 6/2014 |
| KR | 10-2014-0079876 A | 6/2014 |
| KR | 10-1408637 B1 | 6/2014 |
| KR | 10-2015-0144724 A | 12/2015 |
| KR | 10-2016-0024803 A | 3/2016 |
| WO | WO-2016076302 A1 * | 5/2016 ............. B32B 27/34 |

* cited by examiner

OPTICAL FILM AND IMAGE DISPLAY DEVICE INCLUDING SAME

TECHNICAL FIELD

Cross-Reference to Related Application(s)

This application is a 35 U.S.C. § 371 National Phase Entry Application from PCT/KR2017/014572, filed on Dec. 12, 2017, and designating the United States, which claims the benefit of filing dates of Korean Patent Application No. 10-2016-0168857 filed with Korean Intellectual Property Office on Dec. 12, 2016 and Korean Patent Application No. 10-2017-0169718 filed with Korean Intellectual Property Office on Dec. 11, 2017, the entire contents of which are incorporated herein by reference.

The present invention relates to an optical film exhibiting excellent optical properties such as low gloss value and reflectance, and an appropriate level of haze properties, and to an image display device including the same.

BACKGROUND

In an image display device such as an organic light emitting diode (OELD) or a liquid crystal display (LCD), it is required to prevent a decrease in contrast due to a reflection of external light or a reflection of an image, and a deterioration of the visibility. For this purpose, in order to reduce a reflection of an image and a reflection of light by using scattering of light or optical interference, an optical laminated film such as an antireflection film is formed on the surface of the image display device.

For example, in a liquid crystal display or the like, an optical laminated film including an antiglare layer has been generally formed. Such an antiglare layer mainly includes a binder and fine particles contained in the binder, and these fine particles are usually formed so that a part thereof protrudes on the surface of the binder. That is, the antiglare layer allows the fine particles protruding on the surface of the binder to control light scattering/light reflection, thereby suppressing deterioration of the visibility of the image display device.

However, in the case of previously known antiglare layers and optical films, the gloss value of the surface is often high and it is difficult to suppress the reflection of external light. Consequently, it is impossible to sufficiently suppress a decrease in the contrast/visibility of the image display device or the like. In addition, in the previous antiglare layers and optical films, it is difficult to properly control the surface irregularities and thus, a defective glitter due to the irregularities may often occur, and further scattering or reflection of external light could not be properly controlled. This also was a cause of deteriorating the optical properties such as the haze property or the gloss value of the previous antiglare layers and optical films.

Finally, conventional antiglare layers and the optical films have disadvantages in that the optical properties such as haze properties, reflectance or gloss value are not sufficient and the contrast/visibility of the image display device are not sufficiently improved. As a result, there is a continuing need to further improve the optical properties of the antiglare layers and optical films.

Technical Problem

In this regard, the present invention provides an optical film exhibiting excellent optical properties such as low gloss value and reflectance, and an appropriate level of haze properties.

Further, the present invention provides an image display device comprising the above-mentioned optical film.

Technical Solution

The present invention provides an optical film comprising:

a light-transmitting substrate film;

an antiglare layer including a binder containing a (meth) acrylate-based crosslinked polymer, and organic fine particles of a micron (μm) scale dispersed on the binder and inorganic fine particles of a nanometer (nm) scale dispersed on the binder; and a low refractive index layer which is formed on the antiglare layer and includes a binder resin containing a (co)polymer of a photopolymerizable compound, and hollow silica particles dispersed in the binder resin, wherein in case where the total average particle size of the organic and inorganic fine particles is defined as D average, the particle size of the fine particles corresponding to the cumulative 25% when the organic and inorganic fine particles are arranged in order from the smallest particle size to the largest size is defined as D25, and the particle size of the fine particles corresponding to the cumulative number of 75% is defined as D75, (D75−D25)/D average is 0.25 or less, wherein the absolute value of the refractive index difference between the organic and inorganic fine particles and the binder is 0.01 to 0.25, wherein the total content of the organic and inorganic fine particles is 1 to 30% by weight of the total content of the antiglare layer, and wherein a deviation of the 60-degree gloss value is 3% to 10%, and a total haze value is 1 to 5%.

The present invention also provides an optical film comprising:

a light-transmitting substrate film;

an antiglare layer including a binder containing a (meth) acrylate-based crosslinked polymer, and plural types of light-transmitting fine particles having a sub-micron (sub-μm) scale dispersed on the binder; and a low refractive index layer which is formed on the antiglare layer and includes a binder resin containing a (co)polymer of a photopolymerizable compound, and hollow silica particles dispersed in the binder resin, wherein in case where the total average particle size of the light-transmitting fine particles is defined as D average, the particle size of the fine particles corresponding to the cumulative 25% when the light-transmitting fine particles are arranged in order from the smallest particle size to the largest size is defined as D25, and the particle size of the fine particles corresponding to the cumulative 75% is defined as D75, (D75−D25)/D average is 0.04 to 0.15, wherein the absolute value of the refractive index difference between the light-transmitting fine particles and the binder is 0.02 to 0.25, wherein the total content of the light-transmitting fine particles is 1 to 30% by weight of the total content of the antiglare layer, wherein a reflectance is 0.5% to 2.5%, and wherein a deviation of the 60-degree gloss value is 3% to 10%, and a total haze value is 1 to 5%.

In addition, the present invention provides an image display device comprising the optical film.

Hereinafter, the optical film and the image display device according to specific embodiments of the present invention will be described in detail.

As used herein, the micron (μm) scale refers to having a particle size or particle size of less than 1 mm, i.e., less than 1000 μm, the nano (nm) scale refers to having a particle size or particle size of less than 1 μm, i.e., less than 1000 nm, and the sub-micron (sub-μm) scale refers to having a particle size or particle size of micron scale or nanoscale.

Further, the photopolymerizable compound is collectively referred to as a compound that undergoes cross-linking, curing, or polymerization when it is irradiated with light, for example, when it is irradiated with visible light or ultraviolet light.

Further, the (meth)acrylate refers to including both acrylate and methacrylate.

Further, the (co)polymer refers to including both a copolymer and a homopolymer.

Further, the hollow silica particles refer to silica particles which are derived from a silicon compound or an organic silicon compound and have an empty space on the surface and/or inside thereof.

According to one embodiment of the present invention, there is provided an optical film comprising:

a light-transmitting substrate film;

an antiglare layer including a binder containing a (meth) acrylate-based crosslinked polymer, and organic fine particles of a micron (μm) scale dispersed on the binder and inorganic fine particles of a nanometer (nm) scale dispersed on the binder;

a low refractive index layer which is formed on the antiglare layer and includes a binder resin containing a (co)polymer of a photopolymerizable compound, and hollow silica particles dispersed in the binder resin, wherein in case where the total average particle size of the organic and inorganic fine particles is defined as D average, the particle size of the fine particles corresponding to the cumulative 25% when the organic and inorganic fine particles are arranged in order from the smallest particle size to the largest size is defined as D25, and the particle size of the fine particles corresponding to the cumulative number of 75% is defined as D75, (D75−D25)/D average is 0.25 or less, wherein the absolute value of the refractive index difference between the organic and inorganic fine particles and the binder is 0.01 to 0.25, wherein the total content of the organic and inorganic fine particles is 1 to 30% by weight of the total content of the antiglare layer, and wherein a deviation of the 60-degree gloss value is 3% to 10%.

According to the result of numerous experiments conducted by the present inventors, it has been found that in the antiglare layer containing organic and inorganic fine particles dispersed in a (meth)acrylate-based binder, by controlling the particle size distribution of the organic and inorganic fine particles to an appropriate level, controlling the average value of (D75−D25)/D to be 0.25 or less, or 0.04 to 0.15, and controlling the composition of the binder, and the refractive index difference between the binder and the fine particles, it is possible to provide an antiglare layer and an optical film having excellent antiglare properties.

This is presumably because the fine particle size in the antiglare layer can be uniform through the control of the particle size distribution, and thus, the size of the irregularity projecting on the surface of the antiglare layer can be uniformly and appropriately controlled, and the haze properties and gloss value of the antiglare layer can be adjusted within a preferable range. In addition, by controlling the refractive index difference between the binder and the fine particles, scattering or reflection of external light can be effectively suppressed, thereby providing an antiglare layer and an optical film having excellent antiglare properties and optical properties. If the particle size distribution range deviates from the above-mentioned range or deviates from the refractive index difference, the deviation of the haze properties of the optical film may be severe, or the gloss value may be increased, so that the optical property/antiglare property may be greatly deteriorated.

Further, in the optical film of one embodiment, the total content of the organic and inorganic fine particles contained in the antiglare layer may be controlled to an appropriate level of, for example, 1 to 30% by weight, or 2 to 20% by weight, or 3 to 10% by weight, or 3 to 5% by weight of the total content of the fine particles and binder in the antiglare layer. As a result, it was confirmed that the optical property/antiglare property of the optical film can be further improved. If the total content of the fine particles is too small, the surface irregularities on the antiglare layer are not properly realized, and scattering/reflection of external light is not properly controlled, and therefore, the antiglare property may be greatly deteriorated. Conversely, if the total content of the fine particles is too large, the refraction of the transmitted image light is increased and thus the image sharpness of the optical film may be greatly lowered.

In addition, the optical film of one embodiment includes a specific binder composition described hereinafter, and specifically, the binder may be formed using a compound with three to six functionalities and a compound with ten or more functionalities. As a result, the optical properties of the binder are optimized, and simultaneously the refractive index difference with respect to the above-mentioned fine particles is appropriately controlled and the optical property/antiglare property such as the haze property or the gloss value of the optical film can be optimized.

In addition, the optical film of one embodiment further includes a hollow silica particle-containing low refractive index layer formed on the antiglare layer. By forming a low refractive index layer as described above, external light reflection of the optical film can be further suppressed, and thereby, the optical properties of the optical film can be further improved.

As described above, by optimizing the configuration of the antiglare layer and forming the low refractive index layer, the optical film of one embodiment can exhibit excellent optical properties and antiglare properties such as low gloss value, gloss variation and reflectance, and appropriate level of haze properties.

Hereinafter, the optical film of one embodiment of the invention will be described specifically for each component.

The optical film of one embodiment includes a light-transmitting substrate film exhibiting light transmittance to at least visible light, and representative examples thereof include a cellulose ester-based substrate film, a polyester-based substrate film, a poly(meth)acrylate-based substrate film or a polycarbonate-based substrate film. More specific examples of such light-transmitting substrate film include triacetyl cellulose (TAC)-based film, polyethylene terephthalate (PET)-based substrate film, polyethylene naphthalate (PEN)-based film, polyacrylate (PA)-based film, polycarbonate (PC)-based film, polymethacrylate (PMMA)-based film or the like. Besides, any resin film known to be applicable to the substrate film of the optical film may be used.

However, in consideration of excellent mechanical properties and water resistance of the substrate film, and excellent optical properties of the optical film of one embodiment, the light-transmitting substrate film may be a film having a thickness of 20 to 500 µm, or 30 to 200 µm, or 40 to 150

In addition, the optical film of one embodiment includes an antiglare layer formed on the substrate film. As already described above, by controlling the refractive index of the fine particles contained in the antiglare layer, the refractive index difference between the fine particles and the binder, and the particle size distribution and the content range of the fine particles, the antiglare properties and the optical properties of the antiglare layer and the optical film can be greatly improved.

In this antiglare layer, the binder may be a crosslinked (co)polymer of a polyfunctional (meth)acrylate-based compound having a (meth)acrylate-based functional group with three or more functionalities. In a more specific example, as the polyfunctional (meth)acrylate-based compound having a (meth)acrylate group with three or more functionalities, a monomolecular type (meth)acrylate-based compound with three to six functionalities; and/or a polyurethane-based polymer, a poly(meth)acryl-based polymer, or a polyester-based polymer, which has a (meth)acrylate-based functional group with ten or more functionalities, may be used.

By virtue of the composition of such a binder, the refractive index difference between the binder and the fine particles can be controlled to a more appropriate level. In addition, the haze properties of the antiglare layer and the optical film can be maintained at an appropriate level, and it can contribute to further improve the image sharpness. If only the monomolecular type (meth)acrylate-based compound with three to six functionalities is used, the haze properties may deviate from an appropriate range, or the image sharpness may be degraded. Furthermore, the optical properties of the antiglare layer are lowered, so that a low level of gloss value and a deviation value thereof are hardly achieved.

Specific examples of the monomolecular type (meth)acrylate-based compound with three to six functionalities include a monomolecular type compound having 3 to 6 (meth)acrylate functional groups per molecule and an aromatic ring (e.g., UA-306T as used in Examples below, etc.), pentaerythritol tri(meth)acrylate, trialkylolpropane tri(meth)acrylate or the like.

Further, as the polyurethane-based polymer, the poly(meth)acryl-based polymer, or the polyester-based polymer, which has a (meth)acrylate-based functional group with ten or more functionalities, a polymer in which an average of 10 to 80 or an average of 10 to 50 (meth)acrylate-based functional groups are bonded to the backbone of the polyurethane-based polymer, poly(meth)acryl-based polymer or polyester-based polymer, can be used, and these polymers may have a weight average molecular weight of 1,000 to 200,000.

Further, the monomolecular type (meth)acrylate-based compound with three to six functionalities, and the polymer having a (meth)acrylate-based functional group with ten or more functionalities may be used, for example, in a weight ratio of 1:1 to 10:1, or in a weight ratio of 2:1 to 5:1.

As a binder in the crosslinked (co)polymer form is obtained using the above-mentioned composition, the refractive index of the binder is controlled within a suitable range of, for example, 1.50 to 1.60, 1.50 to 1.54, or 1.51 to 1.53, so that the refractive index difference between the fine particles and the binder that are contained in the antiglare layer can be more effectively controlled, and the haze properties, image sharpness or gloss value and the deviation of the antiglare layer and the optical film can be further improved.

Meanwhile, the antiglare layer contains a plurality of light-transmitting particles of a sub-micron (sub-µm) scale dispersed on the binder, for example, organic fine particles of a micron (µm) scale and inorganic fine particles of a nano (nm) scale. As these light-transmitting fine particles has a refractive index such that the absolute value of the refractive index difference between the fine particle and the above-mentioned binder is 0.01 to 0.25, or 0.02 to 0.25, or 0.02 to 0.10, the antiglare layer can exhibit low gloss value, appropriate haze properties and excellent antiglare properties.

As the organic fine particles, resin particles previously known to be usable in the antiglare layer and the like can be used without particular limitation, and specific examples thereof include resin fine particles containing polystyrene-based resin, poly(meth)acrylate-based resin or poly(meth)acrylate-co-styrene copolymer resin.

Further, such organic fine particles are, for example, spherical particles having a particle size of 1 to 5 µm or 1.5 to 4 µm, which may be those having a refractive index of 1.5 to 1.57, or 1.51 to 1.56, or 1.53 to 1.56.

Further, as the inorganic fine particles, metal oxide fine particles including silica, alumina, zirconia or titania may be used. For example, they are spherical particles having a particle size of 10 nm to 300 nm, or 50 to 200 nm, which may be those having a refractive index of 1.4 to 1.75, or 1.4 to 1.65, or 1.42 to 1.48, or 1.42 to 1.45.

The light-transmitting fine particles containing the above-mentioned organic/inorganic fine particles may have a uniform particle size distribution as already described above. Therefore, the size of the irregularity protruding on the surface of the antiglare layer can be uniformly and appropriately controlled, so that the haze properties and gloss value of the antiglare layer can be controlled within a preferable range. As a result, the antiglare layer and the optical film of one embodiment can exhibit excellent antiglare property/optical property.

More specifically, the D average of the light-transmitting fine particles may be 1.7 µm to 2.3 µm, or 1.8 µm to 2.2 µm, the D25 may be 1.5 µm to 2.1 µm, or 1.8 µm to 2.0 µm, and the D75 may be 1.9 µm to 2.5 µm, or 1.9 µm to 2.2 µm. Thus, the average value of (D75−D25)/D is controlled to 0.25 or less, or 0.04 to 0.15, so that the optical film of one embodiment can exhibit excellent optical properties and the like.

And, in the plural kinds of light-transmitting fine particles, for example, the above-mentioned organic and inorganic fine particles, the total content thereof may be controlled to an appropriate level, for example, from 1 to 30 wt %, or from 2 to 20 wt %, or from 3 to 10 wt %, or from 3 to 5 wt %, based on the total content of the antiglare layer. Further, the organic fine particles and the inorganic fine particles may be used in a weight ratio of 4:1 to 1:2. As already described above, the content of each light-transmitting fine particle is adjusted to an appropriate range, so that the optical film of one embodiment can exhibit more excellent optical properties and the like. If the content range of the fine particles is out of the appropriate range, the surface irregularities on the antiglare layer are not properly realized and thus scattering/reflection of external light is not properly controlled, the antiglare properties may be deteriorated or the refraction of light may be increased, and the image sharpness of the optical film may be greatly deteriorated.

Further, the antiglare layer may have a thickness of 1 to 10 µm, or 2 to 8 and each of the above-mentioned fine particles may be dispersed in the antiglare layer, or can suppress reflection or scattering of external light in a state where at least thereof is protruded, The antiglare layer formed to have the above-mentioned composition and thickness, the particle size distribution of the light-transmitting fine particles, and the like can appropriately suppress the scattering or reflection of external light and thus can have excellent antiglare properties, and can exhibit excellent optical properties such as low gloss value and reflectance, and appropriate haze properties. These excellent optical properties of the antiglare layer can be defined as low gloss value/reflectance of the surface, haze properties, and the like. For example, the antiglare layer and the optical film may have reflectance of 0.5% to 2.5%, or 0.7% to 2.0%, and a 60-degree gloss value of 45% to 70%, or from 50% to 65%, or from 50% to 60%. The 60-degree gloss value is measured 10 times, and the 60-degree gloss deviation value calculated by the formula [(maximum measured value−minimum measured value)/average value] may be 3% to 10%, or 3% to 8%, or 5% to 8%.

In addition, the antiglare layer and the optical film have a total haze value of 1 to 5%, or 2 to 4%, or 2.5 to 3.5%, and can maintain an appropriate level. When the total haze value becomes excessively high, it is obvious that the optical properties are degraded. Even when the total haze value becomes excessively low, the external reflection image is visible without being scattered, and therefore, the visibility and image sharpness of the screen may be deteriorated.

Meanwhile, the above-mentioned antiglare layer can be formed by a composition comprising a photopolymerizable compound including a (meth)acrylate-based compound having the above-mentioned constitution, a photoinitiator, and an organic solvent.

In such composition, as the photoinitiator, conventionally known photoinitiators can be used without particular limitation. Examples of the photoinitiator may be one selected among 1-hydroxycyclohexyl phenyl ketone, benzyl dimethyl ketal, hydroxydimethylacetophenone, benzoin, benzoin methyl ether, benzoin ethyl ether, benzoin isopropyl ether, and benzoin butyl ether, or a mixture of two or more thereof.

At this time, the photoinitiator may be added in an amount of 0.1 to 10 parts by weight based on 100 parts by weight of the photopolymerizable compound of the (meth)acrylate-based compound. When the amount of the photoinitiator is less than 0.1 part by weight relative to 100 parts by weight of the photopolymerizable compound, sufficient photo-curing due to ultraviolet irradiation may not occur. When the amount of the photoinitiator exceeds 10 parts by weight relative to 100 parts by weight of the photopolymerizable compound, the adhesion between the antiglare layer and the substrate film or the like may be deteriorated. Furthermore, when the photoinitiator is contained in an excessively large amount, the antiglare layer and the optical film including the same may show yellowing due to the unreacted initiator with the lapse of time, so that the optical properties of the optical film may be deteriorated.

Further, the composition may further comprise an organic solvent. When such an organic solvent is added, its constitution is not limited, but in consideration of ensuring an appropriate viscosity of the composition and the film strength of the finally formed film, the organic solvent may be used in an amount of preferably 50 to 700 parts by weight, more preferably 100 to 500 parts by weight, and most preferably 150 to 450 parts by weight based on 100 parts by weight of the photopolymerizable compound.

In this case, the type of usable organic solvent is not particularly limited, but one selected from the group consisting of lower alcohols having 1 to 6 carbon atoms, acetates, ketones, cellosolve, dimethylformamide, tetrahydrofuran, propylene glycol monomethyl ether, toluene and xylene, and mixtures of at least one thereof may be used.

At this time, examples of the lower alcohol may be methanol, ethanol, isopropyl alcohol, butyl alcohol, isobutyl alcohol, diacetone alcohol, and the like. Further, the acetates may be methyl acetate, ethyl acetate, isopropyl acetate, butyl acetate, or cellosolve acetate, and the ketones may be methyl ethyl ketone, methyl isobutyl ketone, acetylacetone, or acetone.

Meanwhile, the composition for forming the antiglare layer may further include at least one additive selected from the group consisting of a dispersant, a leveling agent, a wetting agent, a defoaming agent, and an antistatic agent. In this case, the additive may be added within the range of 0.01 to 10 parts by weight based on 100 parts by weight of the binder-forming compound.

The antiglare layer may be formed by coating the above-mentioned composition onto one surface of the light-transmitting substrate film, followed by drying and photo-curing. These drying and photo-curing conditions may be in accordance with the conditions of a general process for forming the antiglare layer, and specific process conditions are also described in Examples provided hereinafter.

Meanwhile, the optical film of one embodiment described above further includes a low refractive index layer formed on the antiglare layer. Such a low refractive index layer includes a binder resin containing a (co)polymer of a photopolymerizable compound, and hollow silica particles dispersed in the binder resin.

By including such a low refractive index layer, the reflection itself in the light-transmitting substrate film can be reduced, and as a result, the occurrence of interference fringes and reflectance can be further reduced in the optical films of one embodiment. Further, by using such a low refractive index layer, the diffuse reflection on the display surface of the image display device can be reduced, thereby further improving resolution and visibility.

The low refraction layer may have a refractive index of, for example, 1.3 to 1.5 and a thickness of 1 to 300 nm in order to effectively suppress the reflection in the substrate film or the diffuse reflection on the display surface of the display device.

Meanwhile, the low refractive index layer may be formed from a photo-curable coating composition for forming a low refractive index layer including a photopolymerizable compound and hollow silica particles. Specifically, the low refractive index layer may include a binder resin containing a (co)polymer of a photopolymerizable compound and hollow silica particles dispersed in the binder resin.

The photopolymerizable compound contained in the low refractive index layer may include a monomer or an oligomer containing a (meth)acrylate or vinyl group. Specifically, the photopolymerizable compound may include a monomer or an oligomer containing one or more, two or more, or three or more of (meth)acrylate or vinyl groups.

Specific examples of the monomer or oligomer containing (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or a urethane-modified acrylate oligomer, an epoxide acrylate oligomer, an ether acrylate oligomer, a dendritic acrylate oligomer, or a mixture of two or more thereof. Herein, the molecular weight of the oligomers is preferably 1,000 to 10,000.

Specific examples of the monomer or oligomer containing a vinyl group include divinylbenzene, styrene, and para-methyl styrene.

Meanwhile, the photo-curable coating composition for forming a low reflective index layer may further include a fluorine-based compound containing a photoreactive functional group. Accordingly, the binder resin of the low refractive index layer may include a cross-linked polymer of the photopolymerizable compound already described above and the fluorine-based compound containing the photoreactive functional group.

The fluorine-based compound containing the photoreactive functional group may include or be substituted with at least one photoreactive functional group, and the photoreactive functional group refers to a functional group which can participate in a polymerization reaction by irradiation of light, for example, by irradiation of visible light or ultraviolet light. The photoreactive functional group may include various functional groups known to be able to participate in a polymerization reaction by irradiation of light. Specific examples thereof include a (meth)acrylate group, an epoxide group, a vinyl group or a thiol group.

The fluorine-based compound containing the photoreactive functional group may have a fluorine content of 1 to 25% by weight. When the content of fluorine in the fluorine-based compound containing the photoreactive functional group is too small, it may be difficult to sufficiently secure the physical properties such as stain resistance or alkali resistance. In contrast, when the content of fluorine in the fluorine-based compound containing the photoreactive functional group is too large, the surface properties such as scratch resistance of the low refractive index layer may be deteriorated.

The fluorine-based compound containing the photoreactive functional group may further include silicon or a silicon compound. That is, the fluorine-based compound containing the photoreactive functional group may optionally contain silicon or a silicon compound therein.

The fluorine-based compound containing the photoreactive functional group may have a weight average molecular weight (weight average molecular weight in terms of polystyrene measured by GPC method) of 2,000 to 200,000. When the weight average molecular weight of the fluorine-based compound containing the photoreactive functional group is too small, the low refractive index layer obtained from the photo-curable coating composition of the embodiment may not have sufficient alkali resistance. Further, when the weight average molecular weight of the fluorine-based compound containing the photoreactive functional group is too large, the low refractive index layer obtained from the photo-curable coating composition of the embodiment above may not have sufficient durability and scratch resistance.

The photo-curable coating composition may contain 0.1 to 10 parts by weight of the fluorine-based compound containing the photoreactive functional group based on 100 parts by weight of the photopolymerizable compound of the monomer or oligomer containing the (meth)acrylate or vinyl group. When the fluorine-based compound containing the photoreactive functional group is added in excess relative to the photopolymerizable compound, the coating properties of the photo-curable coating composition may be reduced, or the low refractive index layer obtained from the photo-curable coating composition may not have sufficient dura-bility or scratch resistance. In contrast, when the amount of the fluorine-based compound containing the photoreactive functional group is too small relative to the photopolymerizable compound, the low refractive index layer obtained from the photo-curable coating composition may not have sufficient alkali resistance.

Meanwhile, the hollow silica particles refer to silica particles which have a maximum diameter of less than 200 nm and have voids on the surface and/or inside thereof. The hollow silica particles may have a diameter of 1 to 200 nm, or 10 to 100 nm.

As for the hollow silica particles, silica particles whose surface is coated with a fluorine-based compound may be used either alone or in combination with silica particles whose surface is not coated with a fluorine-based compound. When the surface of the hollow silica particles is coated with a fluorine-based compound, the surface energy may be further reduced. Accordingly, the hollow silica particles may be more uniformly distributed in the photo-curable coating composition, and the durability and scratch resistance of the film obtained from the photo-curable coating composition may be further improved.

Further, the hollow silica particles may be included in the composition in a colloidal phase dispersed in a predetermined dispersion medium. The colloidal phase containing the hollow silica particles may contain an organic solvent as a dispersion medium.

Herein, examples of the organic solvent in the dispersion medium include alcohols such as methanol, isopropyl alcohol, ethylene glycol and butanol, etc.; ketones such as methyl ethyl ketone and methyl isobutyl ketone, etc.; aromatic hydrocarbons such as toluene and xylene, etc.; amides such as dimethylformamide, dimethylacetamide and N-methylpyrrolidone; etc.; esters such as ethyl acetate, butyl acetate and gamma-butylolactone, etc; ethers such as tetrahydrofuran and 1,4-dioxane, etc.; or a mixture thereof.

The photo-curable coating composition may include 10 to 500 parts by weight or 50 to 400 parts by weight of the hollow silica particles based on 100 parts by weight of the photopolymerizable compound. When the hollow silica particles are added in an excessive amount, the scratch resistance and abrasion resistance of the coating film may be reduced due to a decrease in the content of the binder. Further, when the hollow silica particles are added in a small amount, uniform film formation of the hollow silica particles may not be not performed, and the desired effect may not be exhibited due to the increase of the reflectance and the refractive index.

As the photopolymerization initiator, any compound known to be usable in the photo-curable coating composition may be used without particular limitation. Specifically, a benzophenone-based compound, an acetophenone-based compound, a nonimidazole-based compound, a triazine-based compound, an oxime-based compound, or a mixture of two or more thereof may be used.

The photopolymerization initiator may be used in an amount of 1 to 100 parts by weight based on 100 parts by weight of the photopolymerizable compound.

Meanwhile, the photo-curable coating composition may further include an organic solvent.

Non-limiting examples of the organic solvent include ketones, alcohols, acetates and ethers, or mixtures of two or more thereof.

Specific examples of the organic solvent include ketones such as methyl ethyl ketone, methyl isobutyl ketone, acetylacetone or isobutyl ketone, etc.; alcohols such as methanol, ethanol, n-propanol, i-propanol, n-butanol, i-butanol or t-butanol, etc.; acetates such as ethyl acetate, i-propyl acetate, or polyethylene glycol monomethyl ether acetate, etc.; ethers such as tetrahydrofuran or propylene glycol monomethyl ether, etc.; or a mixture of two or more thereof.

The organic solvent may be added at the time of mixing the respective components to be included in the photo-curable coating composition, or may be included in the photo-curable coating composition as the respective components are added to the organic solvent in a state of being dispersed in or mixed with the organic solvent.

Meanwhile, the low refractive index layer included in the optical film of one embodiment can be obtained by coating the above-mentioned photo-curable coating composition onto the antiglare layer, and then drying and photo-curing the coated product. The specific process conditions of such a low refractive index layer may be subject to conditions that are obvious to those skilled in the art, and are specifically described even in Examples provided hereinafter, and therefore, additional description thereof will be omitted.

Another example of the above-mentioned optical film may comprise:

a light-transmitting substrate film;

an antiglare layer including a binder containing a (meth) acrylate-based crosslinked polymer, and plural types of light-transmitting fine particles having a sub-micron (sub-μm) scale dispersed on the binder; and a low refractive index layer which is formed on the antiglare layer and includes a binder resin containing a (co)polymer of a photopolymerizable compound, and hollow silica particles dispersed in the binder resin, wherein in case where the total average particle size of the light-transmitting fine particles is defined as D average, the particle size of the fine particles corresponding to the cumulative 25% when the light-transmitting fine particles are arranged in order from the smallest particle size to the largest size is defined as D25, and the particle size of the fine particles corresponding to the cumulative 75% is defined as D75, (D75−D25)/D average is 0.04 to 0.15, wherein the absolute value of the refractive index difference between the light-transmitting fine particles and the binder is 0.02 to 0.25, wherein the total content of the light-transmitting fine particles is 1 to 30% by weight of the total content of the antiglare layer, wherein a reflectance is 0.5% to 2.5%, and wherein a deviation of the 60-degree gloss value is 3% to 10%, and a total haze value is 1 to 5%.

As already mentioned above, the optical film can exhibit excellent antiglare properties, in particular, can effectively suppress scattering or reflection of external light at the surface of the image display device, and can exhibit excellent optical properties such as low gloss value and reflectance and an appropriate level of haze properties. Therefore, such an optical film can be very preferably used in various image display devices.

Meanwhile, according to another embodiment, there may be provided an image display device including the optical film described above.

An example of such a polarizing plate and an image display device can be constructed as follows.

The image display device may be a liquid crystal display device including a pair of polarizing plates facing each other; a thin film transistor, a color filter, and a liquid crystal cell sequentially stacked between the pair of polarizing plates; and a backlight unit. The image display surface of the liquid crystal display device may include the optical film of the above-described embodiment.

Advantageous Effects

According to the present invention, there can be provided an optical film exhibiting excellent optical properties such as low gloss value and reflectance, and an appropriate level of haze properties.

Such optical film can be preferably used in various image display devices, thereby greatly improving the visibility and the like.

DETAILED DESCRIPTION OF THE EMBODIMENTS

Specific embodiments of the present invention are now described in more detail by way of the following examples. However, these examples are given for illustrative purposes only, and the scope of the present invention is not intended to be limited to or by the examples.

Preparation Example: Preparation of Composition for Forming an Antiglare Layer, and Photo-Curable Coating Composition for Forming Low Refractive Index Layer (1) Preparation of Composition for Forming an Antiglare Layer The components shown in Table 1 below were uniformly mixed to prepare a composition for forming an antiglare layer. The contents of all components used in Table 1 are shown in parts by weight.

TABLE 1

|  |  | Preparation Example 1 | Preparation Example 2 | Preparation Example 3 | Preparation Example 4 | Preparation Example 5 |
|---|---|---|---|---|---|---|
| Binder | UA-306T | 4.804 | 4.426 | 4.434 | 5.103 | 4.804 |
|  | 8BR-500 | 8.948 | 8.223 | 6.771 | 6.241 | 8.948 |
|  | TMPTA | 22.161 |  | 12.313 | 14.180 | 22.161 |
|  | PETA |  | 20.234 | 11.084 | 6.241 |  |
| Organic fine particles (refractive index) | 113BQ (1.555) | 0.999 | 1.266 | 0.739 | 0.849 | 0.999 |
|  | 97BQ (1.525) |  |  |  |  |  |
| Inorganic fine particles (refractive index) | 9600A (100 nm) (1.430) |  |  | 0.310 | 0.359 |  |
|  | MA-ST (12 nm) (1.430) | 0.200 | 0.087 | 0.200 | 0.220 | 0.200 |

TABLE 1-continued

|  |  |  |  |  |  |  |
|---|---|---|---|---|---|---|
| Initiator | I184 | 2.537 | 2.278 | 2.337 | 2.697 | 2.537 |
| Dispersant | BYK300 | 0.269 | 0.253 | 0.250 | 0.280 | 0.269 |
| Solvent | IPA | 40.058 | 63.233 | 61.562 | 42.550 | 40.058 |
|  | EtOH | 20.024 |  |  | 21.280 | 20.024 |
|  | Total | 100 | 100 | 100 | 100 | 100 |
|  | Total content of antiglare layer[1] (part by weight) | 37.11 | 34.24 | 35.85 | 33.19 | 37.11 |
|  | Fine particle content/antiglare layer content (wt %) | 3.231 | 3.95 | 3.48 | 4.30 | 3.231 |
| Refractive index | Binder | 1.517 | 1.526 | 1.521 | 1.520 | 1.517 |
|  | Organic fine particles (average) | 1.555 | 1.555 | 1.555 | 1.555 | 1.555 |
|  | Inorganic fine particles (average) | 1.430 | 1.430 | 1.430 | 1.430 | 1.43 |
|  | Absolute value of refractive index difference (binder & organic fine particle) | 0.038 | 0.029 | 0.034 | 0.035 | 0.038 |
|  | Absolute value of refractive index difference (binder & inorganic fine particle) | 0.087 | 0.096 | 0.091 | 0.09 | 0.087 |

|  |  | Comparative Preparation Example 1 | Comparative Preparation Example 2 | Comparative Preparation Example 3 | Comparative Preparation Example 4 | Comparative Preparation Example 5 |
|---|---|---|---|---|---|---|
| Binder | UA-306T | 4.804 |  | 4.426 | 3.426 | 4.804 |
|  | 8BR-500 | 8.948 | 4.40 | 8.223 | 6.223 |  |
|  | TMPTA | 22.161 | 26.316 |  |  | 22.161 |
|  | PETA |  |  | 20.234 | 15.044 | 8.948 |
| Organic fine particles (refractive index) | 113BQ (1.555) | 0.999 | 0.202 |  | 11.000 | 0.999 |
|  | 97BQ (1.525) |  |  | 1.266 |  |  |
| Inorganic fine particles (refractive index) | 9600A (100 nm) (1.430) |  |  |  |  |  |
|  | MA-ST (12 nm) (1.430) | 0.200 | 0.03 |  | 0.03 | 0.200 |
| Initiator | I184 | 2.536 | 2.024 | 2.278 | 2.024 | 2.537 |
| Dispersant | BYK300 | 0.270 | 0.506 | 0.253 | 0.253 | 0.269 |
| Solvent | IPA | 40.058 | 66.522 | 63.320 | 62.000 | 40.058 |
|  | EtOH | 20.024 |  |  |  | 20.024 |
|  | Total | 100 | 100 | 100 | 100 | 100 |
|  | Total content of antiglare layer[1] (part by weight) | 37.12 | 30.95 | 34.12 | 35.72 | 37.11 |
|  | Fine particle content/antiglare layer content (wt %) | 3.23 | 0.75 | 3.71 | 30.88 | 3.231 |
| Refractive index | Binder | 1.517 | 1.512 | 1.526 | 1.526 | 1.517 |
|  | Organic fine particles (average) | 1.555 | 1.555 | 1.525 | 1.555 | 1.555 |
|  | Inorganic fine particles (average) | 1.430 | 1.430 | 1.430 | 1.430 | 1.430 |
|  | Absolute value of refractive index difference (binder & organic fine particle) | 0.038 | 0.043 | 0.001 | 0.029 | 0.038 |

TABLE 1-continued

| | | | | | |
|---|---|---|---|---|---|
| Absolute value of refractive index difference (binder & inorganic fine particle) | 0.087 | 0.082 | 0.096 | 0.096 | 0.087 |

1) The total content of the antiglare layer is calculated by the total content of the binder and the organic/inorganic fine particles, except for the dispersant, solvent, and initiator that are removed during the formation process, in the composition for forming an antiglare layer.

2) The refractive index of the binder is measured after crosslinking (co)polymerization according to the above compositions and preparation examples described hereinafter, and the refractive index of the organic/inorganic fine particles is derived from an average value when two or more kinds are used.

1) UA-306T: (Kyoeisha): hexafunctional acrylate-based compound formed by reacting toluene diisocyanate with two pentaerythritol triacrylates
2) 8BR-500 (TAISEI FINE CHEMICAL): polymer to which a urethane acrylate functional group with about 40 functionalities is bonded to a polyacryl backbone
3) TMPTA: trimethylolpropane triacrylate
4) PETA: Pentaerythritol triacrylate
5) 1184 (Irgacure 184): photoinitiator, manufactured by Ciba
6) BYK 300: PDMS dispersant
7) 113BQ (XX-113BQ, manufactured by Sekisui Plastic): PMMA-PS crosslinked copolymer fine particles having a refractive index of 1.555 and an average particle size of 2 μm
8) 97BQ(XX-97, manufactured by Sekisui Plastic): PMMA-PS crosslinked copolymer fine particles having a refractive index of 1.525 (about 1.53) and an average particle size of 2 μm
9) 9600A: spherical silica fine particles (X24-9600A; Shin-Etsu) having a volume average particle size of 100 nm and a refractive index of 1.43
40) MA-ST: dispersion solution in which spherical silica fine particles having a volume average particle size of 12 nm and a refractive index of 1.43 (manufactured by Nissan Chemical) is dispersed in methanol at a concentration of 30%

(2) Preparation of Photo-Curable Coating Composition for Forming Low Refractive Layer The remaining components of Table 2 below were mixed and then diluted in a mixed solution of MIBK (methyl isobutyl ketone) and IPA (weight ratio=1:1) to prepare a photo-curable coating composition for forming a low refractive layer. The contents of all components used in Table 2 are shown in parts by weight.

TABLE 2

| | Preparation Example 6 |
|---|---|
| DPHA | 1.38 |
| THRULYA 4320 | 4.56 |
| Irgacure-127 | 0.55 |
| RS-907 | 0.51 |
| IPA | 46.50 |
| MIBK | 46.50 |
| Total | 100 |

1) DPHA: dipentaerythritol hexaacrylate, molecular weight of 524.51 g/mol, manufactured by Kyoeisha.

2) THRULIA 4320: hollow silica dispersion, solid content 20 wt % in MIBK solvent, manufactured by JGC Catalyst and Chemicals.
3) Irgacure-127: photoinitiator manufactured by BASF.
4) RS-907: fluorine-based compound containing photoreactive functional group, solid content 30 wt % in MIBK solvent, manufactured by DIC.

Examples 1 to 5 and Comparative Examples 1 to 6: Preparation of Optical Film

As shown in Table 3 below, the antiglare layer compositions respectively prepared in Preparation Examples 1 to 5 or Comparative Preparation Examples 1 to 5 were coated onto a PET substrate film having a thickness of 100 μm and a refractive index of 1.6 to 1.7, dried at 90° C. for 1 minute, and then irradiated with ultraviolet rays of 150 mJ/cm$^2$ to prepare an antiglare layer.

Then, in Examples 1 to 5 and Comparative Examples 1 to 6, the low refractive layer on the antiglare layer was formed as follows.

The composition prepared in Preparation Example 6 was coated on the antiglare layer with Meyer Bar #3 and dried at 90° C. for 1 minute. Then, the dried material was irradiated with ultraviolet rays of 180 mJ/cm$^2$ under a nitrogen purge to form a low refractive index layer having a thickness of 100 nm, thereby forming an optical film.

Experimental Example: Measurement of Physical Properties of Optical Film

The physical properties of the optical films prepared above were measured according to the following methods, and the results are shown in Table 3 below.

1. Measurement of Particle Size Distribution of Light-Transmitting (Organic/Inorganic) Fine Particles The particle diameters of the light-transmitting fine particles (organic/inorganic fine particles) contained in Preparation Examples 1 to 5 and Comparative Preparation Examples 1 to 5 were measured in a COULTER PARTICLE SIZE ANALYZER, and the fine particles were arranged in order from the smallest particle size to the largest size. From this, a particle size distribution curve of the light transmitting fine particles was derived. The organic fine particles were mixed with a solvent such as ethanol, methanol, and isopropyl alcohol to prepare a dispersion solution, and then the measurement was performed. In the case of the inorganic fine particles supplied in the form of a dispersion, the solution was diluted with the same solvent as the dispersion solvent and analyzed.

From the particle size distribution curves, the average total particle diameter of the light-transmitting fine particles was determined as D average. The particle size of the fine particles corresponding to the cumulative 25% when the organic and inorganic fine particles were arranged in the order from the smallest particle size to the largest size was determined as D25, and the particle size of the fine particles corresponding to the cumulative number of 75% was determined as D75. From these measured values, the average value of (D75−D25)/D was calculated.

2. Measurement of Refractive Index

The refractive indexes of the binder, the antiglare layer, the low refractive index layer and the like contained in the optical film were measured in a state of being coated on the wafer using an ellipsometer. More specifically, the refractive indexes of the binder, the antiglare layer, and the low refractive index layer were measured by a method in which each composition was applied to a 3 cm×3 cm wafer, coated using a spin coater (coating condition: 1500 rpm, 30 seconds), dried at 90° C. for 2 minutes and irradiated with ultraviolet rays under the condition of 180 mJ/cm² under nitrogen purge. Thereby, each coating layer having a thickness of 100 nm was formed.

The ellipsometry was measured for the coating layer at an incidence angle of 70° over a wavelength range of 380 nm to 1000 nm by using J. A. Woollam Co. M-2000 apparatus. The measured ellipsometry data (Ψ, Δ) was fitted to a Cauchy model of the following general formula 1 using Complete EASE software so that MSE became 3 or less.

$$n(\lambda) = A + \frac{B}{\lambda^2} + \frac{C}{\lambda^4}$$

Wherein, n(λ) is a refractive index at a wavelength λ (300 nm to 1800 nm), and A, B and C are Cauchy parameters.

Meanwhile, the refractive indexes of the substrate film and the respective fine particles used information provided on the commercially available product.

3. Evaluation of Total/Internal/External Haze Value

A 4 cm×4 cm optical film specimen was prepared. the average value was calculated by measuring three times with a haze meter (HM-150, A light source, Murakami Color Research Laboratory), which was calculated as a total haze value. In the measurement, the transmittance was measured according to JIS K 7361, and the haze value was measured according to JIS K 7105. In measuring the internal haze value, an adhesive film having a total haze value of 0 was bonded to the coated surface of the optical film to be measured to make the irregularities of the surface smooth, and an internal haze value was measured in the same manner as that of the total haze value.

The external haze value was calculated as the average of the values obtained by calculating the difference between the total haze value and the measured value of the internal haze.

4. Evaluation of the 20°/60° Gloss Value and the Deviation Value Thereof

The 20°/60° gloss value was measured using the micro-TRI-gloss manufactured by BYK Gardner Co., Ltd. At the time of measurement, a black tape (3M) was attached to the surface of the substrate film on which the coating layer was not formed so as not to transmit light. The 20°/60° gloss value was measured by varying the incidence angle of light to 20°/60°, and the average value measured five or more times was calculated as the gloss value.

The deviation of the 60-degree gloss value was calculated by measuring the gloss value over 10 times by the above method and calculating the deviation from the data.

5. Reflectance

The reflectance was measured as an average reflectance using a SolidSpec 3700 manufactured by SHIMADZU.

Specifically, a black tape (Vinyl tape 472 Black, manufactured by 3M) was attached to the surface of the optical film on which the coating layer was not formed so as not to transmit light. After fixing the measurement conditions with sampling interval 1 mm, time constant 0.1 sec, slit width 20 nm and medium scanning speed, the optical film was irradiated with light having a wavelength of 380 nm to 780 nm by applying the 100T mode. Thereby, the reflectance was measured.

TABLE 3

|  | Example 1 | Example 2 | Example 3 | Example 4 | Example 5 | Comparative Example 1 |
|---|---|---|---|---|---|---|
| Substrate film | PET | PET | PET | PET | PET | PET |
| Refractive index of substrate film | 1.6~1.7 (birefringence) | 1.6~1.7 (birefringence) | 1.6~1.7 (birefringence) | 1.6~1.7 (birefringence) | 1.6~1.7 (birefringence) | 1.6~1.7 (birefringence) |
| Constitution of antiglare layer | Preparation Example 1 | Preparation Example 2 | Preparation Example 3 | Preparation Example 4 | Preparation Example 5 | Comparative Preparation Example 1 |
| Thickness of antiglare layer (μm) | 4.5 | 5.0 | 4.5 | 4.0 | 5.0 | 4.0 |
| D average (μm) | 2.1 | 1.98 | 2.1 | 1.98 | 2.03 | 2.02 |
| D25 (μm) | 1.96 | 1.84 | 1.96 | 1.84 | 1.96 | 1.76 |
| D75 (μm) | 2.15 | 2.02 | 2.15 | 2.02 | 2.09 | 2.29 |
| (D75 − D25)/D average | 0.090 | 0.091 | 0.090 | 0.091 | 0.064 | 0.262 |
| Low refractive layer | formed | formed | formed | formed | formed | formed |
| Thickness of low refractive layer(nm) | 100 | 100 | 100 | 100 | 100 | 100 |
| Refractive index of low refractive layer | 1.41 | 1.41 | 1.41 | 1.41 | 1.41 | 1.41 |

TABLE 3-continued

| | | | | | | |
|---|---|---|---|---|---|---|
| Total haze value | 3.4 | 3.3 | 3.3 | 3.5 | 3.5 | 3.1 |
| Internal haze value | 3.1 | 2.9 | 3.1 | 3.1 | 3.2 | 2.8 |
| External haze value | 0.3 | 0.4 | 0.3 | 0.4 | 0.3 | 0.3 |
| Gloss value(20-degree) | 27.3 | 28.1 | 27.6 | 28.5 | 28.2 | 27.8 |
| Gloss value(60-degree) | 53.2 | 52.8 | 52.6 | 52.3 | 53.2 | 53 |
| 60-degree gloss deviation (%) | 6.5 | 6.6 | 6.5 | 6.7 | 6.2 | 15.1 |
| Reflectance (%) | 1.5 | 1.5 | 1.5 | 1.5 | 1.5 | 1.5 |

| | Comparative Example 2 | Comparative Example 3 | Comparative Example 4 | Comparative Example 5 | Comparative Example 6 |
|---|---|---|---|---|---|
| Substrate film | PET | PET | PET | PET | PET |
| Refractive index of substrate film | 1.6~1.7 (birefringence) | 1.6~1.7 (birefringence) | 1.6~1.7 (birefringence) | 1.6~1.7 (birefringence) | 1.6~1.7 (birefringence) |
| Constitution of antiglare layer | Comparative Preparation Example 2 | Comparative Preparation Example 3 | Comparative Preparation Example 4 | Preparation Example 1 | Comparative Preparation Example 5 |
| Thickness of antiglare layer (μm) | 4.5 | 5.0 | 4.5 | 4.5 | 5.0 |
| D average (μm) | 1.98 | 2.01 | 1.98 | 2.1 | 2.03 |
| D25 (μm) | 1.84 | 1.85 | 1.84 | 1.96 | 1..96 |
| D75 (μm) | 2.02 | 2.03 | 2.02 | 2.15 | 2.09 |
| (D75 − D25)/D average | 0.091 | 0.090 | 0.091 | 0.090 | 0.064 |
| Low refractive layer | formed | formed | formed | uniformed | formed |
| Thickness of low refractive layer(nm) | 100 | 100 | 100 | X | 100 |
| Refractive index of low refractive layer | 1.41 | 1.41 | 1.41 | X | 1.41 |
| Total haze value | 0.9 | 0.6 | 11.5 | 3.4 | 5.4 |
| Internal haze value | 0.8 | 0.1 | 9.2 | 3.1 | 5.0 |
| External haze value | 0.1 | 0.5 | 2.3 | 0.3 | 0.4 |
| Gloss value(20-degree) | 26.3 | 27.2 | 12.4 | 68.7 | 23.1 |
| Gloss value(60-degree) | 51.5 | 52 | 48.8 | 86.6 | 52.4 |
| 60-degree gloss deviation (%) | 5.8 | 8.6 | 14.3 | 5.7 | 7.2 |
| Reflectance (%) | 1.5 | 1.5 | 1.5 | 3.9 | 1.5 |

Referring to Table 3, it was confirmed that the optical films of Examples 1-5 can exhibit excellent optical properties, such as low gloss value and reflectance, and an appropriate level of haze properties. On the other hand, it was confirmed that in Comparative Examples 1 and 4, since the gloss deviation value is too high the uniformity of the optical properties is greatly lowered. In addition, it was confirmed that in Comparative Example 5, the reflection of external light cannot be properly suppressed because the gloss value is too high and the reflectance is high.

Further, it was confirmed that in Comparative Examples 2 and 3, the haze value is too low, and thus the external reflection image is not scattered and is visible, and therefore, the visibility and image sharpness of the screen are poor. In contrast, it was confirmed that in Comparative Example 6, since the internal haze value and the total haze value are too high, the optical properties are not sufficient and the visibility of the screen is poor.

The invention claimed is:

1. An optical film comprising:
   a light-transmitting substrate film;
   an antiglare layer including a binder containing a (meth)acrylate-based crosslinked polymer, and organic fine particles of a micron (μm) scale dispersed in the binder and inorganic fine particles of a nanometer (nm) scale dispersed in the binder;
   a low refractive index layer which is directly formed on the antiglare layer and includes a binder resin containing a (co)polymer of a photopolymerizable compound, and hollow silica particles dispersed in the binder resin,
   wherein (D75-D25)/D average is 0.25 or less, wherein the total average particle size of the organic and inorganic fine particles is defined as D average, and where the organic and inorganic fine particles are arranged in order from the smallest particle size to the largest size, the particle size of the fine particles corresponding to the cumulative 25% is defined as D25 and the particle size of the fine particles corresponding to the cumulative number of 75% is defined as D75,
   wherein the absolute value of the refractive index difference between the organic and inorganic fine particles and the binder is 0.01 to 0.25,
   wherein the total content of the organic and inorganic fine particles is 1 to 30% by weight of the total content of the antiglare layer,
   wherein the (meth)acrylate-based crosslinked polymer includes a monomolecular (meth)acrylate-based compound with three to six (meth)acrylate functionalities, and a crosslinked (co)polymer of a polyfunctional (meth)acrylate-based compound including a polyurethane-based polymer, a poly(meth)acryl-based polymer, or a polyester-based polymer, having a (meth)acrylate-based functional group with ten or more (meth)acrylate functionalities;
   wherein the monomolecular (meth)acrylate-based compound with three to six functionalities and the crosslinked (co)polymer of a polyfunctional (meth)acrylate-based compound having a (meth)acrylate-based functional group with ten or more (meth)acrylate functionalities are in a weight ratio of 3:1 to 5:1,
   wherein the optical film has a deviation of the 60-degree gloss value of 3% to 10%, and a total haze value of 1 to 5%, and
   wherein the antiglare layer is a single layer.

2. The optical film of claim 1, wherein the light-transmitting substrate film is a cellulose ester-based substrate film, a polyester-based substrate film, a poly(meth)acrylate-based substrate film or a polycarbonate-based substrate film, having a thickness of 20 to 500 μM.

3. The optical film of claim 1, wherein the binder in the antiglare layer has a refractive index of 1.50 to 1.60.

4. The optical film of claim 1, wherein the organic fine particles include polystyrene-based resin, poly(meth)acrylate-based resin or poly(meth)acrylate-co-styrene copolymer resin.

5. The optical film of claim 1, wherein the organic fine particles are spherical particles having a particle size of 1 to 5 μm and have a refractive index of 1.5 to 1.57.

6. The optical film of claim 1, wherein the inorganic fine particles are metal oxide fine particles including silica, alumina, zirconia or titania.

7. The optical film of claim 1, wherein the inorganic fine particles are spherical particles having a particle size of 10 nm to 300 nm, and have a refractive index of 1.4 to 1.75.

8. The optical film of claim 1, wherein the D average is 1.7 μm to 2.3 μm, the D25 is 1.5 μm to 2.1 μm, and the D75 is 1.9 μm to 2.5 μm.

9. The optical film of claim 1, wherein the antiglare layer has a thickness of 1 to 10 μM.

10. The optical film of claim 1, wherein the low refractive index layer has a refractive index of 1.3 to 1.5 and a thickness of 1 to 300 nm.

11. An image display device comprising the optical film of claim 1.

12. An optical film comprising:
    a light-transmitting substrate film;
    an antiglare layer including a binder containing a (meth)acrylate-based crosslinked polymer, and plural types of light-transmitting fine particles having a sub-micron (sub-μm) scale dispersed in the binder;
    a low refractive index layer which is formed directly on the antiglare layer and includes a binder resin containing a (co)polymer of a photopolymerizable compound, and hollow silica particles dispersed in the binder resin,
    wherein (D75-D25)/D average is 0.04 to 0.15, wherein the total average particle size of the light-transmitting fine particles is defined as D average, and where the light-transmitting fine particles are arranged in order from the smallest particle size to the largest size, the particle size of the fine particles corresponding to the cumulative 25% is defined as D25 and the particle size of the fine particles corresponding to the cumulative number of 75% is defined as D75,
    wherein the absolute value of the refractive index difference between the light-transmitting fine particles and the binder is 0.02 to 0.25,
    wherein the total content of the light-transmitting fine particles is 1 to 30% by weight of the total content of the antiglare layer,
    wherein the (meth)acrylate-based crosslinked polymer includes a monomolecular (meth)acrylate-based compound with three to six (meth)acrylate functionalities, and a crosslinked (co)polymer of a polyfunctional (meth)acrylate-based compound including a polyurethane-based polymer, a poly(meth)acryl-based polymer, or a polyester-based polymer, having a (meth)acrylate-based functional group with ten or more (meth)acrylate functionalities;
    wherein the monomolecular (meth)acrylate-based compound with three to six functionalities and the crosslinked (co)polymer of a polyfunctional (meth)acrylate-based compound having a (meth)acrylate-based functional group with ten or more (meth)acrylate functionalities are in a weight ratio of 3:1 to 5:1, wherein a reflectance is 0.5% to 2.5%,
wherein the optical film has a deviation of the 60-degree gloss value of 3% to 10%, and a total haze value of 1 to 5%, and
wherein the antiglare layer is a single layer.

13. An image display device comprising the optical film of claim 12.

\* \* \* \* \*